(12) United States Patent
Loeken et al.

(10) Patent No.: US 11,525,663 B2
(45) Date of Patent: Dec. 13, 2022

(54) ROTATION ANGLE MEASUREMENT SYSTEM

(71) Applicant: FRABA B.V., Sg Heerlen (NL)

(72) Inventors: Michael Loeken, Juelich (DE); Florian Hallermann, Aachen (DE); Hanno Volker, Aachen (DE)

(73) Assignee: FRABA B.V., SG Heerlen (NL)

( * ) Notice: Subject to any disclaimer, the term of this patent is extended or adjusted under 35 U.S.C. 154(b) by 15 days.

(21) Appl. No.: 17/261,031

(22) PCT Filed: Jul. 20, 2018

(86) PCT No.: PCT/EP2018/069744
§ 371 (c)(1),
(2) Date: Jan. 18, 2021

(87) PCT Pub. No.: WO2020/015834
PCT Pub. Date: Jan. 23, 2020

(65) Prior Publication Data
US 2021/0302148 A1 Sep. 30, 2021

(51) Int. Cl.
*G01B 7/30* (2006.01)
*G01D 5/14* (2006.01)
*G01D 5/20* (2006.01)
*G01D 5/24* (2006.01)

(52) U.S. Cl.
CPC ............... *G01B 7/30* (2013.01); *G01D 5/145* (2013.01); *G01D 5/2033* (2013.01); *G01D 5/24* (2013.01)

(58) Field of Classification Search
CPC ........ G01B 7/30; G01D 5/145; G01D 5/2033; G01D 5/24
See application file for complete search history.

(56) References Cited

U.S. PATENT DOCUMENTS

| 2010/0213927 | A1  | 8/2010  | Mehnert et al. |
|---|---|---|---|
| 2012/0098529 | A1* | 4/2012  | Kurihara ............... G01D 5/145 324/207.25 |
| 2015/0323346 | A1  | 11/2015 | Maiterth et al. |

(Continued)

FOREIGN PATENT DOCUMENTS

| CN | 2804807 Y | 8/2006 |
|---|---|---|
| CN | 101832789 A | 9/2010 |

(Continued)

*Primary Examiner* — Reena Aurora
(74) *Attorney, Agent, or Firm* — Norman B. Thot

(57) ABSTRACT

A rotation angle measurement system for detecting a rotation of a shaft. The rotation angle measurement system includes the shaft which extends in an axial direction, a rotor unit having a sensor magnet, a stationary stator unit having a multi-turn sensor unit which is arranged radially spaced apart from the shaft and which has a Wiegand sensor, and a magnetic shielding arrangement for the Wiegand sensor. The rotor unit is connected to the shaft to rotate therewith and radially surrounds the shaft. The multi-turn sensor unit functionally interacts with the sensor magnet to detect revolutions thereof. The magnetic shielding arrangement is made from a material having a high magnetic permeability. The magnetic shielding arrangement includes shielding elements which are arranged to surround the Wiegand sensor on a radial inside, on a radial outside, on a first axial side, and on a second axial side thereof.

12 Claims, 5 Drawing Sheets

(56) References Cited

U.S. PATENT DOCUMENTS

2016/0214648 A1    7/2016  Schoepe et al.
2020/0158791 A1*   5/2020  Marauska ................ G01D 5/16

FOREIGN PATENT DOCUMENTS

| | | |
|---|---|---|
| CN | 103944344 A | 7/2014 |
| CN | 204361860 U | 5/2015 |
| CN | 104769394 A | 7/2015 |
| CN | 104870958 A | 8/2015 |
| DE | 102 59 223 B3 | 2/2004 |
| DE | 10 2009 004 780 A1 | 7/2010 |
| DE | 10 2009 019 719 A1 | 11/2010 |
| DE | 10 2009 051 978 A1 | 5/2011 |
| DE | 10 2011 012 357 A1 | 8/2012 |
| JP | S57-133309 A | 8/1982 |
| JP | H03-078258 U | 8/1991 |
| JP | 9-033548 A | 2/1997 |
| JP | 2008-039632 A | 2/2008 |
| JP | 2018-054573 A | 4/2018 |
| JP | 6765193 B2 * 10/2020 ......... F16H 25/2015 |

\* cited by examiner

ROTATION ANGLE MEASUREMENT SYSTEM

CROSS REFERENCE TO PRIOR APPLICATIONS

This application is a U.S. National Phase application under 35 U.S.C. § 371 of International Application No. PCT/EP2018/069744, filed on Jul. 20, 2018. The International Application was published in German on Jan. 23, 2020 as WO 2020/015834 A1 under PCT Article 21(2).

FIELD

The present invention relates to a rotation angle measurement system for detecting a rotation of a shaft, the rotation angle measurement system comprising a rotor unit connected to the shaft for rotating therewith and radially surrounding the shaft and including at least one sensor magnet, a stationary stator unit having a multi-turn sensor unit arranged radially spaced apart from the shaft and including at least one Wiegand sensor, which multi-turn sensor unit functionally interacts with the sensor magnet to detect shaft revolutions, and at least one magnetic shielding arrangement for the Wiegand sensor, which shielding assembly is made from a material having a high magnetic permeability.

BACKGROUND

Such rotation angle measurement systems serve to measure rotations of a shaft and are frequently referred to as an angle measurement apparatus, a rotation angle sensor, or a rotary position transducer. Such systems are in particular used to control and to monitor electric motors, in particular servomotors, in machines, plants or vehicles. Contactless rotation angle measurement systems, for example, optical or magnetically excited systems, are of particular importance since they have a long service life because they are free of wear.

DE 10 2009 019 719 A1 describes, for example, a magnet-based rotation angle measurement system for detecting the rotation of a shaft. With the aid of magnet-based rotation angle measurement systems, the revolution of the shaft is purely magnetically or magneto-optically detected by the measurement system. The measurement system comprises a rotating rotor unit on which a plurality of sensor magnets are arranged, and a stationary stator unit having a multi-turn sensor unit radially spaced apart from the shaft which includes a Wiegand sensor. The rotor unit is connected to the shaft for rotating therewith so that, during a rotation of the shaft, the sensor magnets are moved past the stationary multi-turn sensor unit, wherein the magnetic field of the sensor magnets is detected by the sensor unit.

Magnetic field sensors, and in particular Wiegand sensors, are very susceptible to magnetic interference fields impressed from outside. When a magnet-based rotation angle measurement system is arranged directly at the drive shaft of an electric motor/generator or a magnetic brake, measurement errors frequently occur since the magnetic field generated by the electric motor/generator or the magnetic brake is transmitted into the rotation angle measurement systems by the shaft which is generally made of metal.

The rotation angle measurement system described in DE 10 2009 019 719 A1 therefore comprises a magnetic shielding arrangement for the Wiegand sensor, which shielding assembly is made from a material having a high magnetic permeability. The magnetic shielding arrangement radially surrounds the shaft and is axially arranged between the Wiegand sensor and a permanent-magnetic ring magnet which forms part of a magnet-based single-turn sensor unit. However, the described magnetic shielding arrangement primarily serves to shield the Wiegand sensor against the magnetic field generated by the ring magnet and does not enable any reliable shielding against magnetic interference fields transmitted along the shaft.

SUMMARY

An aspect of the present invention is to provide a rotation angle measurement system which provides an exact and interference-free detection of the rotation of a shaft.

In an embodiment, the present invention provides a rotation angle measurement system for detecting a rotation of a shaft. The rotation angle measurement system includes the shaft which is configured to extend substantially in an axial direction, a rotor unit comprising at least one sensor magnet, a stationary stator unit comprising a multi-turn sensor unit which is arranged radially spaced apart from the shaft and which comprises at least one Wiegand sensor, and at least one magnetic shielding arrangement for the at least one Wiegand sensor. The rotor unit is connected to the shaft so as to rotate therewith and is configured to radially surround the shaft. The multi-turn sensor unit is configured to functionally interact with the at least one sensor magnet so as to detect revolutions of the shaft. The at least one magnetic shielding arrangement is made from a material having a high magnetic permeability. The at least one magnetic shielding arrangement comprises shielding elements which are arranged to surround the at least one Wiegand sensor on a radial inside of the at least one Wiegand sensor, on a radial outside of the at least one Wiegand sensor, on a first axial side of the at least one Wiegand sensor, and on a second axial side of the at least one Wiegand sensor.

BRIEF DESCRIPTION OF THE DRAWINGS

The present invention is described in greater detail below on the basis of embodiments and of the drawings in which.

DETAILED DESCRIPTION

Figure 1:
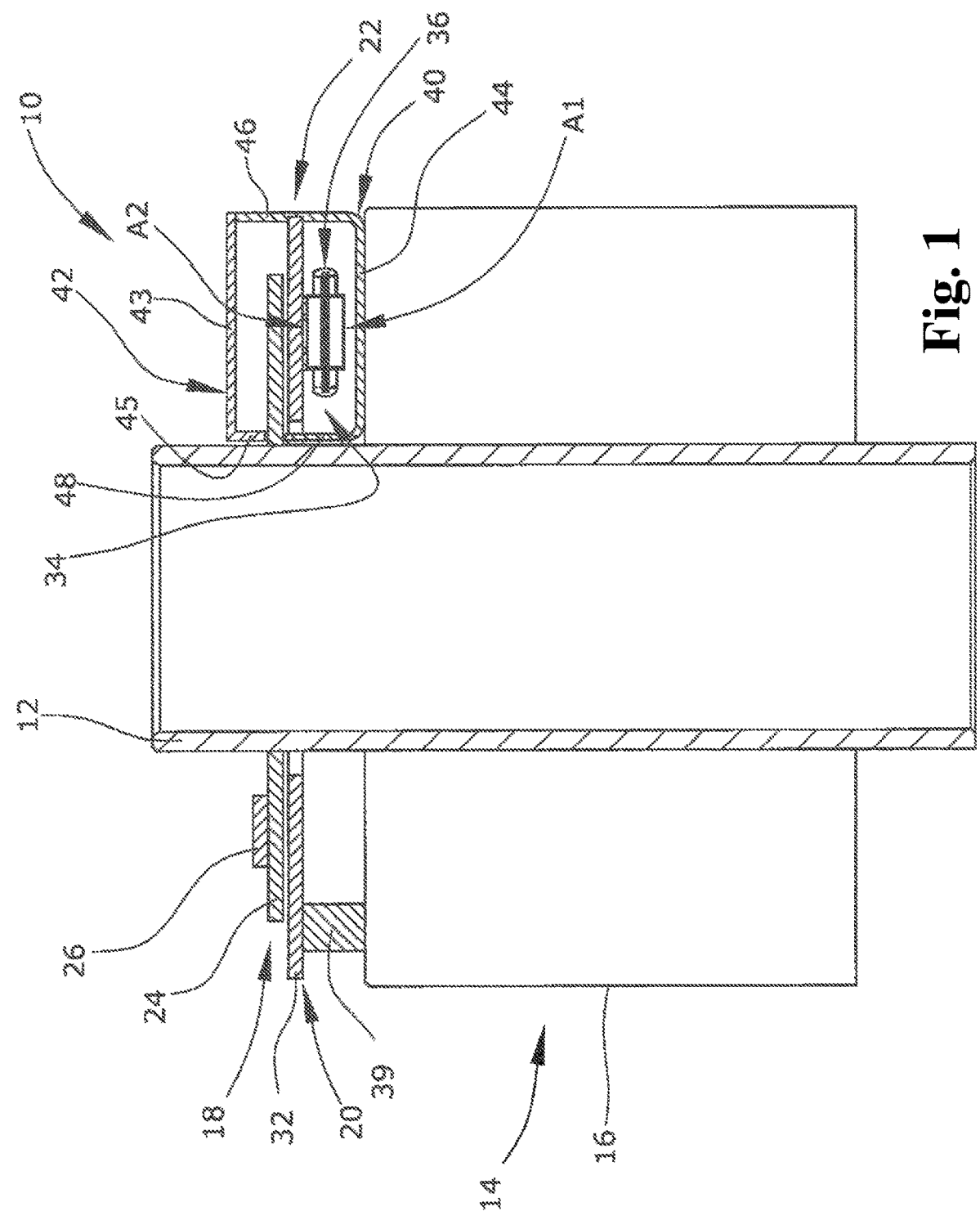
FIG. 1 shows a sectional view of a first exemplary embodiment of a rotation angle measurement system according to the present invention, wherein the rotation angle measurement system is cut along a sagittal plane.
Figure 2:
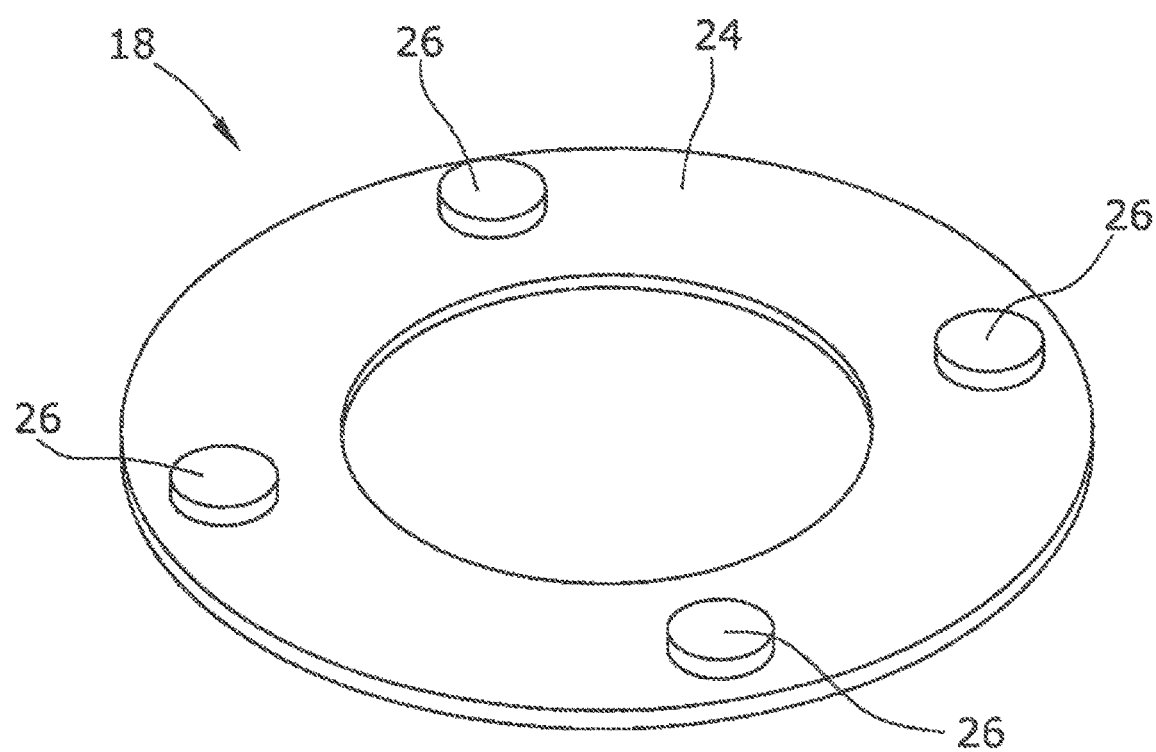
FIG. 2 shows a perspective diagram of the axial upper side of a rotor unit of the rotation angle measurement system of FIG. 1.
Figure 3:
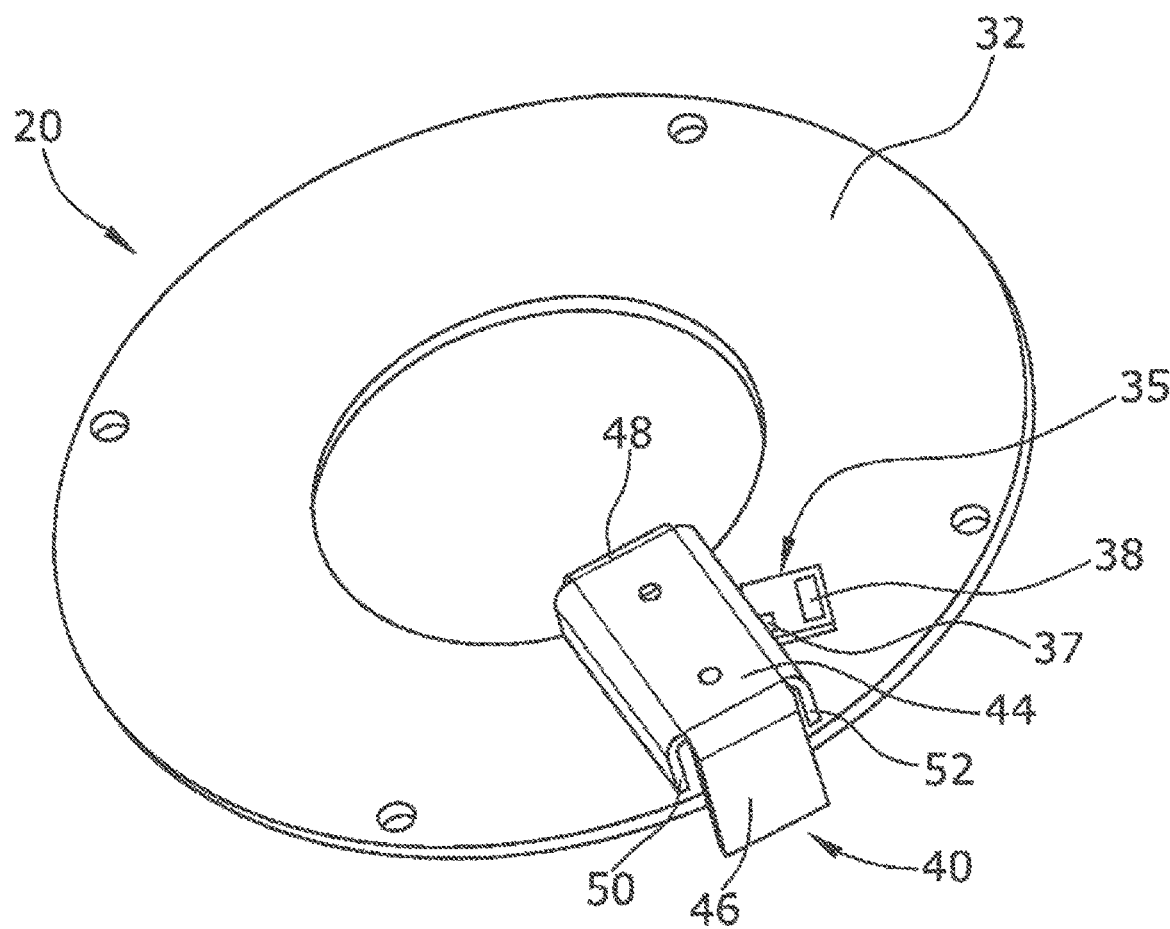
FIG. 3 shows a perspective diagram of the axial lower side of a stator unit with a first shielding element of the rotation angle measurement system of FIG. 1.

According to the present invention, the at least one magnetic shielding arrangement comprises shielding elements surrounding at least one Wiegand sensor in a sagittal plane, i.e., the shielding elements surround the Wiegand sensor on the radial outside and on the radial inside as well as on the axial upper side and on the axial lower side. The shielding elements of the shielding assembly can, for example, be connected to each other so that the shielding elements form a completely closed circle around the Wiegand sensor in the sagittal plane. For simplifying the installation of the rotation angle measurement system, the shielding assembly can, however, also comprise separate shielding elements which are not connected to each other, whereby small air gaps occur between the shielding elements in the sagittal plane, which do not, however, adversely affect the functionality of the magnetic shielding arrangement. The term "surround" thus does not require a completely closed profile of the shielding assembly in the sagittal plane. Since the shielding elements surround the Wiegand sensor in the sagittal plane, external magnetic interference fields, in particular magnetic interference fields impressed into the rotation angle measurement system along the shaft, are guided around the Wiegand sensor via the magnetic shielding arrangement. The magnetic interference fields thus do not reach the Wiegand sensor and consequently do not cause any measurement errors in the Wiegand sensor. The rotation angle measurement system according to the present invention thus provides an exact and interference-free detection of the rotation of the shaft, in particular even when strong magnetic interference fields are impressed into the measurement system via the shaft.

In the case of two or more installed Wiegand sensors, one, two or more shielding assemblies can be provided depending on the assembly. The number of shielding assemblies need not correspond to the number of Wiegand sensors.

The magnetic shielding arrangement can, for example, comprise a first shielding element which surrounds the Wiegand sensor on a first axial side, and the magnetic shielding arrangement can, for example, comprise a second shielding element which surrounds the Wiegand sensor on a second axial side which is opposite the first axial side. The bipartite magnetic shielding arrangement provides a simple installation of the rotation angle measurement system according to the present invention without adversely affecting the functionality of the magnetic shielding arrangement.

In an embodiment of the present invention, the first shielding element can, for example, be arranged in a stationary manner, and the second shielding element can, for example, be connected to the shaft for rotating therewith. The first shielding element can, for example, be fastened to a stationary motor housing or stator housing in a simple manner, and the second shielding element can, for example, be directly fastened to the shaft in a simple manner. This provides a simple installation of the rotation angle measurement system according to the present invention.

In an embodiment of the present invention, both shielding elements, i.e., the first shielding element and the second shielding element, are, for example, arranged in a stationary manner and directly connected to each other. The overall shielding assembly is thus of a stationary configuration. The rotation angle measurement system thus comprises only a small rotating mass so that the shaft to be measured is only loaded to a small degree by the rotation angle measurement system.

In an embodiment of the present invention, the rotation angle measurement system can, for example, comprise a stator housing which is made from a non-magnetizable material and in which the stator unit and the first stationary shielding element are arranged. The stator housing can, for example, be made from a plastic material or from aluminum, thereby providing a lightweight rotation angle measurement system which can consequently be manufactured in an inexpensive manner. Fastening of the first stationary shielding element directly to the stator housing provides a stable fastening as well as an exact alignment of the first shielding element and can be realized in a simple manner without any additional fasteners.

The magnetic shielding arrangement is advantageously provided in the form of a ring segment which is arranged in the circumferential direction at least on an axial side of the Wiegand sensor so that the magnetic shielding arrangement only surrounds a stator unit section in which the Wiegand sensor is arranged. The magnetic shielding arrangement is thus only locally provided in the surroundings of the Wiegand sensor. The magnetic shielding arrangement thus only requires a small amount of magnetic material which is heavy and expensive. The compact configuration of the magnetic shielding arrangement thus allows for the manufacture of a lightweight and inexpensive rotation angle measurement system.

In an embodiment of the present invention, the magnetic shielding arrangement can, for example, comprise shielding elements which surround the Wiegand sensor in a transverse plane. The magnetic shielding arrangement thus surrounds the Wiegand sensor not only on the radial inside and the radial outside, but also on the two lateral sides opposite each other in the circumferential direction. The Wiegand sensor is thus surrounded in all three spatial directions by the magnetic shielding arrangement. This provides a particularly reliable shielding of the Wiegand sensor against external magnetic interference fields and thus an interference-free detection of the rotation of the shaft.

The multi-turn sensor unit advantageously comprises a Hall sensor, and the magnetic shielding arrangement comprises shielding elements which surround the Hall sensor in a sagittal plane. The Hall sensor provides a simple determination of the direction of rotation of the shaft. Since the magnetic shielding arrangement surrounds the Hall sensor in a sagittal plane, i.e., surrounds the Hall sensor on a radial inside thereof and a radial outside thereof as well as on an axial upper side thereof and on an axial lower side thereof, external magnetic interference fields are guided around the Hall sensor via the magnetic shielding arrangement. This provides an interference-free detection of the rotation of the shaft.

The rotor unit can, for example, comprise four sensor magnets which are uniformly distributed along the circumference. The Wiegand sensor can thereby even detect half rotations of the shaft, which provides a reliable detection of the rotation of the shaft.

In an embodiment of the present invention, the shaft can, for example, be a hollow shaft. The rotation angle measurement system according to the present invention is in particular also suitable for detecting the rotation of a hollow shaft where a conventional arrangement of the sensor system at an axial end of the shaft is not possible without any special provisions.

A capacitive single-turn sensor unit for detecting partial rotations of the shaft is advantageously provided, wherein a first single-turn sensor element is arranged at the rotor unit and a second single-turn element is arranged at the stator unit. The capacitive single-turn sensor unit can be integrated into the rotation angle measurement system in a simple manner and provides a particularly exact detection of the shaft rotation.

Two exemplary embodiments of a rotation angle measurement system according to the present invention are described below under reference to the accompanying drawings.

FIG. 1 shows a rotation angle measurement system 10 for detecting the rotation of a shaft 12. In the present exemplary embodiment, the shaft 12 is a hollow shaft which extends essentially in an axial direction and is driven by a drive motor 14 having a static motor housing 16. The rotation angle measurement system 10 comprises a rotor unit 18, a stator unit 20, and a magnetic shielding arrangement 22.

The rotor unit 18 comprises a rotor circuit board 24 which radially surrounds the shaft 12 and is directly fastened to the shaft 12. The rotor unit 18 is thus connected to the shaft 12 for rotating therewith. Four sensor magnets 26 are uniformly arranged on the rotor circuit board 24 along the circumference thereof.

The stator unit 20 comprises a stator circuit board 32 which radially surrounds the shaft 12. A multi-turn sensor unit 34 is arranged on the stator circuit board 32 radially spaced apart from the shaft 12, which multi-turn sensor unit 34 comprises a Wiegand sensor 36 and an integrated circuit 35 having an evaluation unit 38 and a Hall sensor 37. The integrated circuit 35 further comprises a control logics (which is not illustrated in detail in the drawings) and a power management unit (which is also not illustrated in detail in the drawings) which enable a power self-sufficient operation of the multi-turn sensor unit 34 using the electric power from the Wiegand sensor 36. The evaluation unit 38 is further connected to a nonvolatile data memory (which is not illustrated in detail in the drawings) via signals, in which nonvolatile data memory a revolution counter value is stored and read by the evaluation unit 38. The basic functionality of the multi-turn sensor unit 34 is essentially described in DE 102 59 223 B3 which is expressly incorporated by reference herein in connection therewith.

The multi-turn sensor unit 34 is radially positioned so that the Wiegand sensor 36, during a rotation of the shaft 12, detects the magnetic fields of the sensor magnets 26 which co-rotate with the shaft 12 and are thus moved past the Wiegand sensor 36. The stator circuit board 32 is fastened in a stationary manner to the static motor housing 16 via a plurality of stator fasteners 39.

The magnetic shielding arrangement 22 is made from a material having a high magnetic permeability, for example, of iron. In the present exemplary embodiment, the magnetic shielding arrangement 22 has a bipartite configuration. A first shielding element 40 is of an essentially trough-like configuration and comprises a bottom wall 44, two radially opposed front walls 46, 48, and two side walls 50, 52 opposite each other in the circumferential direction.

The bottom wall 44 essentially extends in a transverse plane and is arranged on a first axial side A1 facing away from the rotor unit 18, here the axial lower side, of the Wiegand sensor 36. The front walls 46, 48 each essentially extend in a frontal plane. The first front wall 46 is arranged on the radial outside of the Wiegand sensor 36 and the second front wall 48 is arranged on the radial inside of the Wiegand sensor 36. The second front wall 48 extends from the bottom wall 44 in the axial direction to the axial lower side of the rotor circuit board 24 but does not touch the rotor circuit board 24. The first front wall 46 extends in the axial direction starting from the bottom wall 44 and axially projects beyond the axial upper side of the rotor circuit board 24 and the sensor magnets 26. The side walls 50, 52 each essentially extend in a sagittal plane. The side walls 50, 52 each extend from the bottom wall 44 in the axial direction to the axial lower side of the stator circuit board 32. The first side wall 50 is arranged on a first lateral side of the Wiegand sensor 36, and the second side wall 52 is arranged on the circumferentially opposite second lateral side of the Wiegand sensor 36. The first shielding element 40 is thus configured in the form of a ring segment in the circumferential direction and surrounds only a section of the stator unit 20 in which the Wiegand sensor 36 is arranged.

The first shielding element 40 surrounds the Wiegand sensor 36 both on the two radial sides and on the two lateral sides and thus essentially completely surrounds the Wiegand sensor 36 in a transverse plane. The first shielding element 40 further surrounds the Wiegand sensor 36 also on a first axial side A1 thereof. A second shielding element 42 is fastened at the axial end of the first front wall 46 facing away from the bottom wall 44. The second shielding element 42 comprises a first shielding element wall 43 essentially extending in a transverse plane and a second shielding element wall 45 which adjoins the radial inside of the first shielding element wall 43 and is directed vertically downward. The first shielding element wall 43 extends from the first front wall 46 in the radial direction to the shaft 12, but does not touch the shaft 12. The second shielding element wall 45 extends from the first shielding element wall 43 in the vertical direction to the rotor circuit board 24, but does not touch the rotor circuit board 24. The second shielding element 42 thus surrounds the Wiegand sensor 36 on a second axial side A2 thereof. The magnetic shielding arrangement 22 having the two shielding elements 40, 42 surrounds the Wiegand sensor 36 on both radial sides as well as on both axial sides A1, A2, and thus surrounds the Wiegand sensor 36 in a sagittal plane.

For improving the angle resolution, the rotation angle measurement system 10 comprises a capacitive single-turn sensor unit (which is not illustrated in detail in the drawings) having a first single-turn sensor element arranged on the axial lower side of the rotor unit 18 and having a second sensor element arranged on the axial upper side of the stator unit 20. The rotation angle measurement system 10 further comprises a central logic (which is not illustrated in detail in the drawings) which is connected to the multi-turn sensor unit 34 and the single-turn sensor unit via signals for determining both the absolute number of shaft rotations and the current relative rotation angle of the shaft 12. The central logic unit can be implemented by a microcontroller or by a so-called "field programmable gate array" (FPGA).

Figure 4:
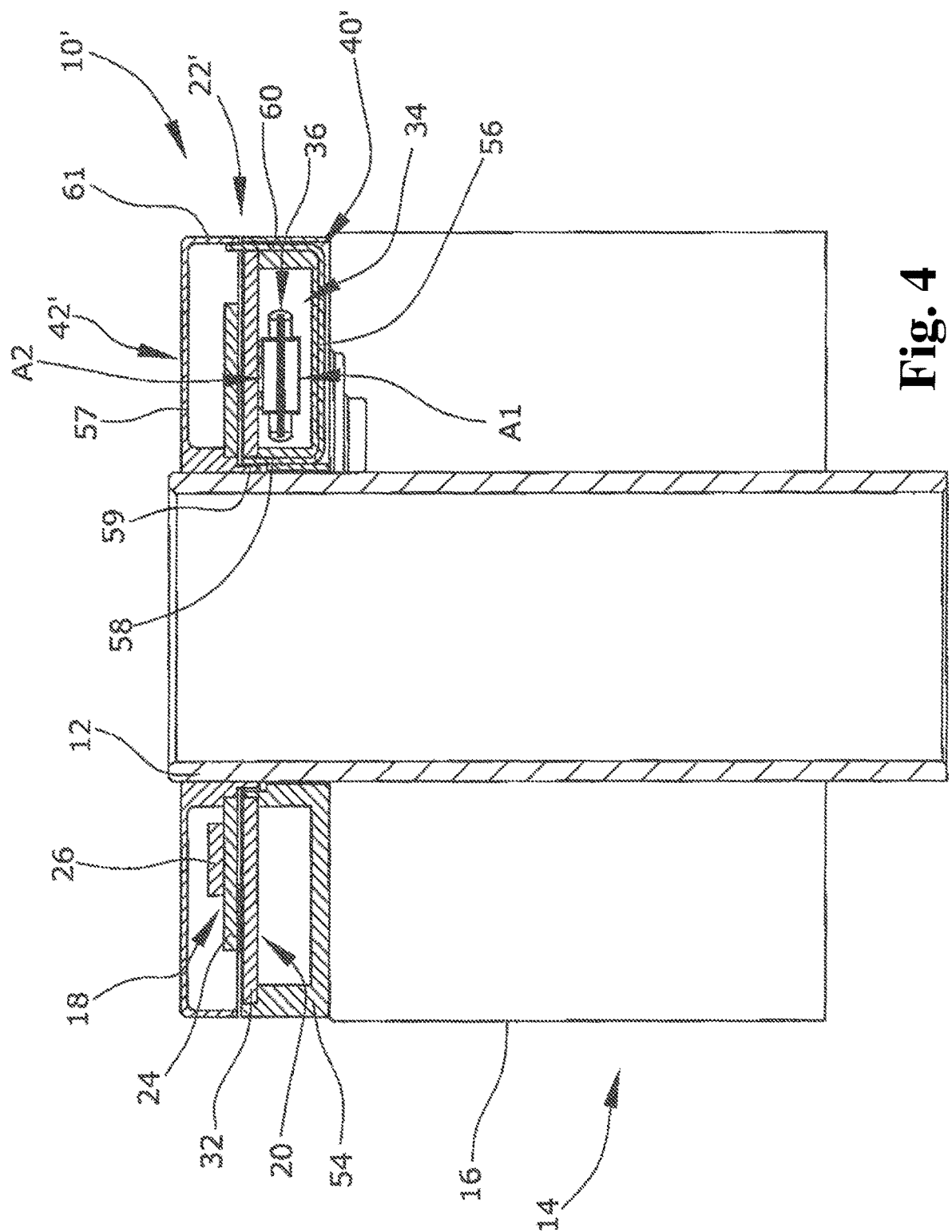
FIG. 4 shows a sectional view of a second exemplary embodiment of a rotation angle measurement system according to the present invention, wherein the rotation angle measurement system is cut along a sagittal plane.
Figure 5:
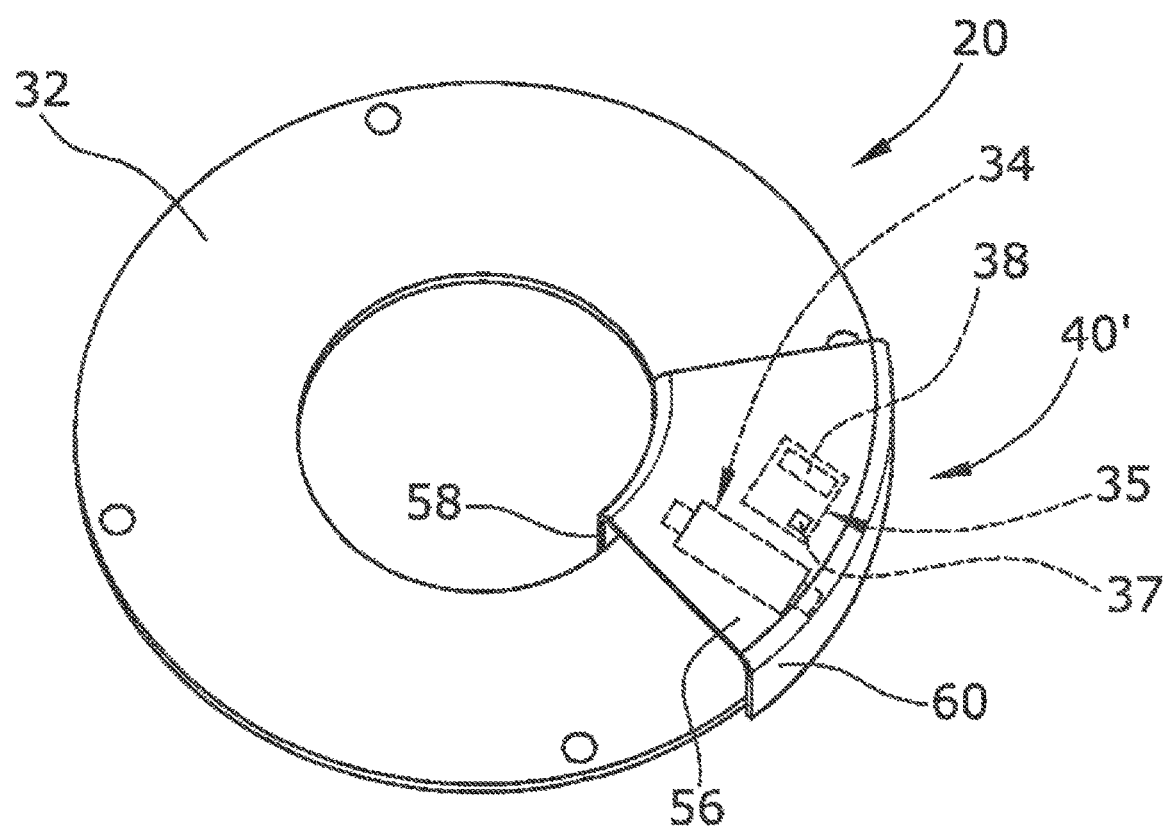
FIG. 5 shows a perspective diagram of the axial lower side of a stator unit with a first shielding element of the rotation angle measurement system of FIG. 4.

FIG. 4 shows an alternative rotation angle measurement system 10' according to the present invention. In the rotation angle measurement system 10', the stationary stator unit 20 is arranged in a ring-shaped stator housing 54 which is made from a plastic material and is fastened to the motor housing 16 in the present exemplary embodiment. The stator housing 54 radially surrounds the shaft 12 and has an essentially U-shaped profile.

The second shielding element 42' is of a ring-shaped configuration and has an essentially U-shaped profile having a cover wall 57 essentially extending in a transverse plane, a radially internal inner wall 59, and a radially external outer wall 61. The second shielding element 42' is directly fastened to the shaft 12 and is thus connected to the shaft 12 for rotating therewith. In the second shielding element 42', the rotor unit 18 is arranged and fastened to the second shielding element 42'. The second shielding element 42' is arranged on the second axial side A2 of the Wiegand sensor 36 and surrounds the Wiegand sensor 36 on the second axial side A2.

The first shielding element 40' is configured as a ring segment and has an essentially U-shaped profile having a bottom wall 56 essentially extending in a transverse plane, a radially internal inner wall 58, and a radially external outer wall 60. The first shielding element 40' is configured and arranged in the stator housing 54 so that it surrounds only a section of the stator unit 20 in which the Wiegand sensor 36 and the integrated circuit 35 having the Hall sensor 37 are arranged. The inner wall 58 of the first shielding element 40' surrounds the radial inside of the Wiegand sensor 36 and overlaps in an axial direction the inner wall 59 of the second shielding element 42'. The outer wall 60 of the first shielding element 40' surrounds the radial outside of the Wiegand sensor 36 and overlaps in the axial direction the outer wall 61 of the second shielding element 42'. The bottom wall 56 of the first shielding element 40' surrounds the first axial side A1 of the Wiegand sensor 36.

The magnetic shielding arrangement 22' thus surrounds the Wiegand sensor 36 on both radial sides as well as on both axial sides A1, A2 and thus completely surrounds the Wiegand sensor 36 in a sagittal plane. The magnetic shielding arrangement 22' further surrounds the Hall sensor 37 on the radial inside thereof and on the radial outside thereof as well as on the axial upper side thereof and on the axial lower side thereof and thus completely in a sagittal plane.

The present invention is not limited to embodiments described herein; reference should be had to the appended claims.

LIST OF REFERENCE NUMERALS

10; 10' Rotation angle measurement system
12 Shaft
14 Drive motor
16 Motor housing
18 Rotor unit
20 Stator unit
22; 22' Magnetic shielding arrangement
24 Rotor circuit board
26 Sensor magnets
32 Stator circuit board
34 Multi-turn sensor unit
35 Integrated circuit
36 Wiegand sensor
37 Hall sensor
38 Evaluation unit
39 Stator fasteners
40; 40' First shielding element
42, 42' Second shielding element
43 First shielding element wall
44 Bottom wall
45 Second shielding element wall
46 First front wall
48 Second front wall
50 First side wall
52 Second side wall
54 Stator housing
56 Bottom wall
57 Cover wall
58 Inner wall
59 Inner wall
60 Outer wall
61 Outer wall
A1 First axial side
A2 Second axial side

What is claimed is:

1. A rotation angle measurement system for detecting a rotation of a shaft, the rotation angle measurement system comprising:
    the shaft which is configured to extend substantially in an axial direction;
    a rotor unit comprising at least one sensor magnet, the rotor unit being connected to the shaft so as to rotate therewith and being configured to radially surround the shaft;
    a stationary stator unit comprising a multi-turn sensor unit which is arranged radially spaced apart from the shaft and which comprises at least one Wiegand sensor, the multi-turn sensor unit being configured to functionally interact with the at least one sensor magnet so as to detect revolutions of the shaft; and
    at least one magnetic shielding arrangement for the at least one Wiegand sensor, the at least one magnetic shielding arrangement being made from a material having a high magnetic permeability, the at least one magnetic shielding arrangement comprising shielding elements which are arranged to surround the at least one Wiegand sensor on a radial inside of the at least one Wiegand sensor, on a radial outside of the at least one Wiegand sensor, on a first axial side of the at least one Wiegand sensor, and on a second axial side of the at least one Wiegand sensor.

2. The rotation angle measurement system as recited in claim 1, wherein,
    the shielding elements of the at least one magnetic shielding arrangement each comprise a first shielding element and a second shielding element,
    the first shielding element is arranged to surround the at least one Wiegand sensor on the first axial side,
    the second shielding element is arranged to surround the at least one Wiegand sensor on the second axial side, and
    the first axial side is opposite the second axial side.

3. The rotation angle measurement system as recited in claim 2, wherein,
    the first shielding element is arranged to be stationary, and
    the second shielding element is connected to the shaft so as to rotate therewith.

4. The rotation angle measurement system as recited in claim 3, further comprising:
    a stationary stator housing which is made from a non-magnetizable material, wherein,
    the stationary stator unit and the first shielding element are arranged within the stationary stator housing.

5. The rotation angle measurement system as recited in claim 2, wherein the first shielding element and the second shielding element are each arranged to be stationary and to be directly connected to each other.

6. The rotation angle measurement system as recited in claim 1, wherein the at least one magnetic shielding arrangement is configured as a ring segment in a circumferential direction at least on the first axial side of the Wiegand sensor so that the at least one magnetic shielding arrangement only surrounds the stationary stator unit in which the at least one Wiegand sensor is arranged.

7. The rotation angle measurement system as recited in claim 6, wherein the shielding elements of the at least one magnetic shielding arrangement are further arranged to surround the at least one Wiegand sensor on a first lateral side of the at least one Wiegand sensor and on a second lateral side of the at least one Wiegand sensor which is opposite to the first lateral side in the circumferential direction.

8. The rotation angle measurement system as recited in claim 1, wherein,
    the multi-turn sensor unit further comprises a Hall sensor, and the shielding elements of the at least one magnetic shielding arrangement are arranged to surround the Hall sensor on a radial inside of the Hall sensor, on a radial outside of the Hall sensor, on a first axial side of the Hall sensor, and on a second axial side of the Hall sensor.

9. The rotation angle measurement system as recited in claim 1, wherein the at least one sensor magnet of the rotor unit is provided as four sensor magnets which are uniformly distributed along a circumference of the rotor unit.

10. The rotation angle measurement system as recited in claim 1, wherein the shaft is a hollow shaft.

11. A rotation angle measurement system for detecting a rotation of a shaft, the rotation angle measurement system comprising:
- the shaft which is configured to extend substantially in an axial direction;
- a rotor unit comprising at least one sensor magnet, the rotor unit being connected to the shaft so as to rotate therewith and being configured to radially surround the shaft;
- a stationary stator unit comprising a multi-turn sensor unit which is arranged radially spaced apart from the shaft and which comprises at least one Wiegand sensor, the multi-turn sensor unit being configured to functionally interact with the at least one sensor magnet so as to detect revolutions of the shaft;
- at least one magnetic shielding arrangement for the at least one Wiegand sensor, the at least one magnetic shielding arrangement being made from a material having a high magnetic permeability, the at least one magnetic shielding arrangement comprising shielding elements which are arranged to surround the at least one Wiegand sensor on a radial inside of the at least one Wiegand sensor, on a radial outside of the at least one Wiegand sensor, on a first axial side of the at least one Wiegand sensor, and on a second axial side of the at least one Wiegand sensor; and
- a stationary stator housing which is made from a non-magnetizable material, wherein,
the shielding elements of the at least one magnetic shielding arrangement each comprise a first shielding element and a second shielding element,
the first shielding element is arranged to surround the at least one Wiegand sensor on the first axial side,
the second shielding element is arranged to surround the at least one Wiegand sensor on the second axial side,
the first axial side is opposite the second axial side,
the first shielding element is arranged to be stationary,
the second shielding element is connected to the shaft so as to rotate therewith, and
the stationary stator unit and the first shielding element are arranged within the stationary stator housing.

12. A rotation angle measurement system for detecting a rotation of a shaft, the rotation angle measurement system comprising:
- the shaft which is configured to extend substantially in an axial direction;
- a rotor unit comprising at least one sensor magnet, the rotor unit being connected to the shaft so as to rotate therewith and being configured to radially surround the shaft;
- a stationary stator unit comprising a multi-turn sensor unit which is arranged radially spaced apart from the shaft and which comprises at least one Wiegand sensor, the multi-turn sensor unit being configured to functionally interact with the at least one sensor magnet so as to detect revolutions of the shaft; and
- at least one magnetic shielding arrangement for the at least one Wiegand sensor, the at least one magnetic shielding arrangement being made from a material having a high magnetic permeability, the at least one magnetic shielding arrangement comprising shielding elements which are arranged to surround the at least one Wiegand sensor on a radial inside of the at least one Wiegand sensor, on a radial outside of the at least one Wiegand sensor, on a first axial side of the at least one Wiegand sensor, and on a second axial side of the at least one Wiegand sensor, wherein,
the shielding elements of the at least one magnetic shielding arrangement each comprise a first shielding element and a second shielding element,
the first shielding element is arranged to surround the at least one Wiegand sensor on the first axial side,
the second shielding element is arranged to surround the at least one Wiegand sensor on the second axial side,
the first axial side is opposite the second axial side, and
the first shielding element and the second shielding element are each arranged to be stationary and to be directly connected to each other.

* * * * *